July 31, 1962     E. P. FRENCH ETAL     3,046,733
ACOUSTIC BUZZ SUPPRESSOR
Filed May 29, 1959

INVENTORS
EDWARD P. FRENCH
BY STANLEY J. MINTON

ATTORNEY

United States Patent Office 3,046,733
Patented July 31, 1962

---

3,046,733
ACOUSTIC BUZZ SUPPRESSOR
Edward P. French, Whittier, and Stanley J. Minton, Woodland Hills, Calif., assignors to The Marquardt Corporation, a corporation of California
Filed May 29, 1959, Ser. No. 816,737
3 Claims. (Cl. 60—35.6)

This invention relates to an acoustic buzz suppressor and more particularly to a buzz suppressor usable in connection with an external compression surface of a jet engine to increase the range of stable subcritical operation.

It is well known that when the flow into a supersonic inlet with an external compression surface, such as a spike-type ramjet inlet, is reduced by increasing the back pressure, a point is reached where the inlet can no longer maintain supersonic flow. A shock wave, normally occurring within the inlet, is driven forward onto the external compression surface and the inlet flow becomes subcritical. As the back pressure is further increased, the expelled shock is moved forward to a point where the entire inlet flow suddenly becomes violently unstable, resulting in large shock movements and fluctuations in pressure and mass flows entering the inlet. This instability is usually termed "buzz" and is a highly undesirable operating condition.

At the present time, it is the common practice to place a pressure relief passage in the exterior surface of the engine aft of the diffuser lip and a suitable control system is utilized to open this passage when the back pressure within the engine approaches a value at which buzz would occur. The opening of the passage relieves the back pressure within the engine so that the shock is not expelled forwardly of the diffuser lip by an amount sufficient for buzz to occur. Such prior systems require complicated control systems for the pressure relief passage and interfere with the air flow within the engine.

The acoustic buzz suppressor of the present invention provides a means for preventing buzz without the use of a control system. Basically, the invention consists of placing a circumferential slot in the center body of the diffuser upstream of the diffuser lip, and this slot communicates with a chamber within the diffuser body. During stable subcritical or supercritical operation of the diffuser, the pressure within the chamber will remain nearly equal to the external pressure at the slot and there will be no net flow to or from the chamber. However when the operation becomes sufficiently subcritical to cause the buzz cycle to start, the shock expelled from the diffuser moves forward over the slot. As the expelled shock moves past the slot, the higher external pressure behind the shock causes flow into the chamber, thus relieving the back pressure on the shock and causing it to return to its initial position.

In addition to relieving the back pressure behind the expelled shock during buzz, the slot and chamber in the diffuser body also has the function of increasing the range of stable subcritical operation because of the effectiveness of the slot and chamber in preventing boundary layer separation from the surface of the diffuser body. As long as the slot is positioned between expelled shock and the point on the surface at which boundary layer separation would normally occur if no slot were present, the slot and chamber have the function of absorbing or damping the forward propagation of the sonic waves accompanying the expelled shock. Without the slot, these sonic waves would travel forward along the compression surface and would sufficiently disturb the boundary layer at some forward point along the surface to cause separation of the boundary layer. Boundary layer separation results when the velocity approaches zero or is reversed and the noise waves accompanying the expelled shock normally move forward along the boundary layer to cause a disruption in velocity flow sufficient to result in separation of the boundary layer at a forward point on the compression surface. The presence of the slot between this normal separation point and the expelled shock serves to absorb or dampen the forward travel of the sonic waves in the boundary layer and thus, the slot and chamber prevent boundary layer separation which would otherwise occur. Therefore, the range of stable subcritical operation can be extended by moving the slot forwardly along the compression surface. Once the equilibrium position of the expelled shock moves past the slot, the slot no longer becomes effective to dampen the sonic waves and buzz will occur.

It is therefore an object of the present invention to provide an acoustic buzz suppressor which automatically suppresses diffuser buzz by relieving the pressure behind the expelled shock.

Another object of the present invention is to provide an acoustic buzz suppressor for a supersonic inlet, which suppressor comprises a chamber in the diffuser body for damping sonic waves moving forward from the expelled shock and for relieving the back pressure behind the expelled shock when diffuser buzz commences.

A further object of the present invention is to provide a buzz suppressor for a supersonic engine inlet, which suppressor includes a slot in the diffuser body at a location forward of the diffuser lip and a chamber within the diffuser body in communication with the slot.

These and other objects of the invention, not specifically set forth above, will become readily apparent from the accompanying description and drawing in which.

Figure 1:
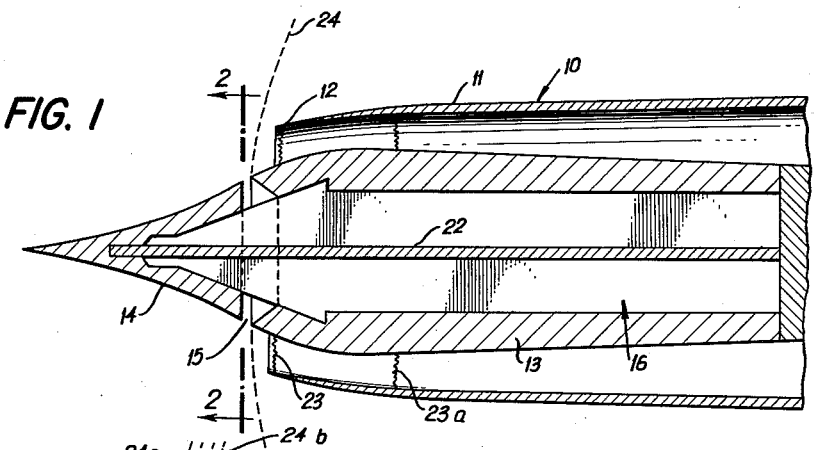
FIGURE 1 is a vertical section of a supersonic engine inlet showing the circumferential slot and internal chamber in the diffuser body.

Referring to FIGURE 1, the supersonic engine inlet 10 comprises a cylindrical diffuser cowl 11 having a diffuser lip 12. A diffuser body 13 is located within the cowl 11 and has a spike surface 14 serving as an external compression surface. This external compression surface contains a circumferential slot 14 which communicates with a hollow chamber 16 within the diffuser body 13. The chamber 16 is divided into four spaces 17, 18, 19 and 20 of equal volume by transverse partition 21 and 22.

During critical operation of the inlet 10, normal shock 23 will be located at the diffuser lip 12 and this shock will assume a rearward position such as 23a during supercritical operation of the engine. However, when the back pressure in the engine increases sufficiently, because of increased fuel flow or for other reasons the inlet will operate subcritically and an expelled normal shock 24 will occur forwardly of the diffuser lip 12. As the back pressure on the engine continues to increase, the expelled shock 24 moves forwardly and at some forward point, the buzz condition will occur.

Figure 4:
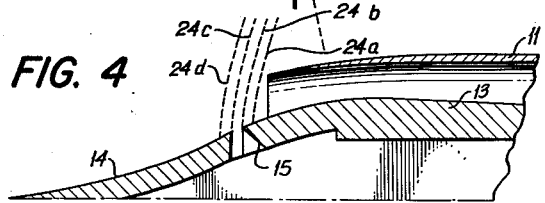
FIGURE 4 is an enlarged partial section of the diffuser showing various positions of the expelled normal shock.
Figure 2:
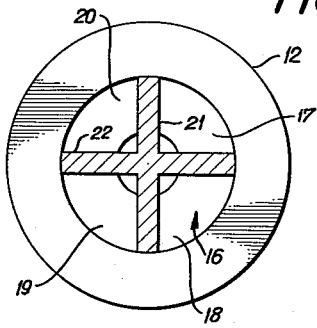
FIGURE 2 is a vertical section along line 2—2 of FIGURE 1 showing the manner in which the partitions divide the chamber into four equal spaces.

Referring to FIGURE 4, the expelled shock 24 is shown in four different positions, 24a through 24d, relative to the slot 15. At position 24a, the inlet has stable subcritical operation, and the forward limit of this stable subcritical operation is at position 24b. If the expelled shock is forced forward to position 24c or 24d, buzz would normally occur without the presence of the slot 15. However, the slot 15 and the chamber 16 serve to relieve the back pressure behind the expelled shock when it moves forward of the slot to positions 24c or 24d, and this relief of the back pressure is accomplished by flow into the chamber 16. By relieving the pressure behind the expelled shock, the shock is caused to return rearwardly so that buzz will not persist. During stable subcritical or supercritical operation, the pressure within the spaces 17–20 will normally remain equal to the external pressure at the slot and there will be no net flow into or out of these spaces. However, when the expelled shock starts to move forwardly of the slot 15, a sudden external pressure rise causes flow into the chamber, thus relieving the back pressure on the shock and causing it to return to its initial position just rearwardly of the slot.

The slot 15 is located ahead of the diffuser lip as far forwardly as stable subcritical operation will occur, since it is only effective ahead of the equilibrium location of the expelled shock. On the other hand, the slot should not be positioned to fall forward of this equilibrium position since it will then allow too much motion of the expelled shock before acting to stop it. Also the slot must be wide enough to handle sufficient mass flow to stop the shock motion during incipient buzz. For instance, the slot must be wide enough to permit sufficient relief of back pressure even though the expelled shock oscillates forward to position 24d. In addition, the volume of chamber 16 must be large enough to accompany flow through the slots for a certain length of time such as the time corresponding to one quarter of a buzz cycle since after this period, the shock motion would reverse even in the absence of the slot.

Figure 5:
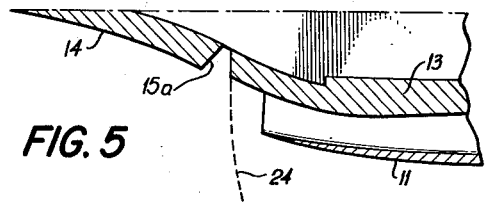
FIGURE 5 is an enlarged partial section of the diffuser in which the slot is moved forward.
Figure 3:
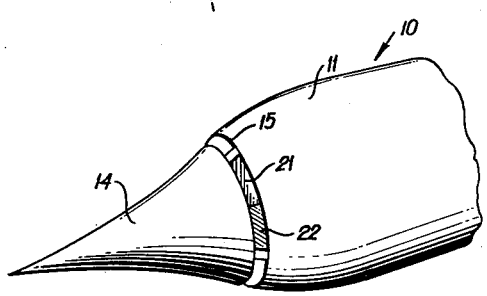
FIGURE 3 is a perspective view of the diffuser body showing the location of the circumferential slot.

The position of the slot forwardly of the diffuser lip is selected such that stable subcritical operation will be present up to the slot. Because of the effect of the slot and chamber on the boundary layer forwardly of the slot, it is possible to position the slot forwardly of a location where buzz would normally occur and still maintain stable subcritical operation. As long as the slot is located between the oblique shock 24 and the location on surface 14 at which boundary layer separation would normally occur if the slot were not present, the slot has the effect of preventing boundary layer separation and thus maintaining stable subcritical operation at positions of the expelled shock forward of that where buzz normally would have occurred. The sound waves which accompany the expelled shock normally would travel forwardly in the boundary layer to a boundary layer separation point and separation would occur because of the effect of the sonic waves on the velocity pattern of the boundary layer. The presence of the slot between the shock wave and the normal separation point serves to dampen out or absorb the sonic waves travelling forwardly in the boundary layer and thus, the slot and chamber prevent separation of the boundary layer and the buzz condition accompanying such separation at increased ranges of subcritical operation where a buzz condition would otherwise result. Because of the effect of the slot and chamber on the boundary layer, the slot 15 could be moved forwardly to a position, such as position 15a illustrated in FIGURE 5, and still maintain stable subcritical operation even though buzz would normally have occurred at a lesser range of subcritical operation. Once the shock is expelled past the slot 15a, buzz will immediately occur since the slot 15a will then no longer be effective on the boundary layer. In either position 15 or 15a, the slot in association with chamber 16 will act to prevent buzz oscillations by relieving the back pressure behind the expelled shock. From the above discussion, it is apparent that the slot 15 will be located at least a distance forwardly of the diffuser lip 12 at which buzz would occur if no slot were present and can be located at positions forward of this position up to the point at which boundary layer separation would occur during buzz if the slot were not present.

The chamber 16 is divided into four separate spaces 17–20 to compensate for variation in pressure occurring at various locations around the slot 15 upon change in angle of attack. With large angles of attack, the pressure at one side of the spike surface 14 at the slot position will be greater than at the other side. Under such conditions, flow could occur from one side of the slot through the other side if the partitions 21 and 22 were not present and such cross flow could occur even during stable subcritical operation. By dividing the chamber into four separate quadrants, each of the spaces 17–20 can receive a different average pressure than that received by another space without developing cross flow from the portions of the slot 15 opposite these two spaces. Also, by having four separate spaces within the diffuser body, the expelled shock could move over one portion of the slot before moving over another portion when the inlet has an angle of attack and this one portion of the slot will become effective to suppress diffuser buzz. Of course, for supersonic inlets which do not experience changes in angles of attack, it would not be necessary to have the chamber 16 divided into separate spaces.

By the present invention, a simple and automatic buzz suppressor is provided which not only suppresses diffuser buzz but also permits an increase in the range of stable subcritical operation by allowing the expelled shock to travel a greater distance forward of the diffuser lip without buzz occurring. It is apparent that this invention can be applied to inlets utilizing various types of diffusers and that the chamber within the diffuser body can be either a single chamber or can be divided into any desired number of separate spaces to minimize angle of attack effects. Also, the slot can assume any desired location between the position forward of the inlet at which buzz would normally occur and the position forward of the inlet at which boundary layer separation would normally occur if no slot were present. It is understood that the slot area and chamber volume will be of such size as to accomplish buzz suppression by permitting sufficient relief of back pressure as the shock moves forward over the slot. Various other modifications are contemplated by those skilled in the art without departing from the spirit and scope of the invention as hereinafter defined by the dependent claims.

What is claimed is:

1. In a supersonic inlet, a diffuser cowl having a diffuser lip at its forward end, a diffuser body located within said cowl, an external compression surface on said body extending forwardly of said diffuser lip and along which normal shock expelled from said engine moves, a chamber within said diffuser body, and slot means in said diffuser body for placing said chamber in communication with the exterior of said compression surface at the location of said slot, said slot means being located forwardly of said diffuser lip at a position where diffuser buzz commences so that said chamber reduces the back pressure behind the expelled shock as it moves over said slot means and thereby prevents continuation of the diffuser buzz, said slot means and chamber being of sufficient size to handle the volume of air flow required to suppress diffuser buzz and move the expelled shock rearwardly.

2. In a supersonic inlet as defined in claim 1 wherein said slot means comprises a slot extending substantially continuously around said diffuser body and located in a place transverse of the axis of said diffuser body.

3. In a supersonic inlet as defined in claim 2 having partition means located within said chamber for dividing said chamber into separate spaces with each space in communication with a separate portion of said slot so that each space operates independently of the other at all angles of attack of the inlet.

References Cited in the file of this patent

UNITED STATES PATENTS

| | | |
|---|---|---|
| 2,783,008 | Bodine | Feb. 26, 1957 |
| 2,811,828 | McLafferty | Nov. 5, 1957 |
| 2,853,852 | Bodine | Sept. 30, 1958 |
| 2,914,911 | Richter | Dec. 1, 1959 |

FOREIGN PATENTS

| | | |
|---|---|---|
| 747,705 | Great Britain | Apr. 11, 1956 |

OTHER REFERENCES

Kantrowitz: "Stabilization of Shock Waves in Channel Flow," Journal of the Aeronautical Sciences, May 1950, v. 17, No. 5, pages 316, 317.

Wilcox: "Factors Influencing Variable Inlet Control Designs," SAE preprint of paper 81c presented at SAE National Aeronautic Meeting, Sept. 29–Oct. 4, 1958, 13 pages, pages 1–4 and 9 (Fig. 1) relied on.